(12) United States Patent
Somasundaram et al.

(10) Patent No.: US 7,139,841 B1
(45) Date of Patent: Nov. 21, 2006

(54) METHOD AND APPARATUS FOR HANDLING EMBEDDED ADDRESS IN DATA SENT THROUGH MULTIPLE NETWORK ADDRESS TRANSLATION (NAT) DEVICES

(75) Inventors: Mahadev Somasundaram, Santa Clara, CA (US); Siva S. Jayasenan, Cupertino, CA (US); Senthil Sivakumar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 662 days.

(21) Appl. No.: 10/202,973

(22) Filed: Jul. 24, 2002

(51) Int. Cl.
*G06F 15/16* (2006.01)
*H04L 12/28* (2006.01)
*H04L 12/18* (2006.01)

(52) U.S. Cl. ............. 709/245; 709/236; 370/401; 370/392

(58) Field of Classification Search ........... 709/238, 709/245, 236; 370/401, 392
See application file for complete search history.

(56) References Cited

U.S. PATENT DOCUMENTS 5,793,763 A    8/1998   Mayes et al. ............ 370/389

(Continued)

OTHER PUBLICATIONS

A. Simu, et al. "Method and Apparatus for Indicating Network Address Translation (NAT) Topology Information to a NAT Device this is Physically Separate from an Application Layer Gateway (ALG) Device", U.S Appl. No. 10/125,300, filed Apr. 17, 2002. 49 pages.

(Continued)

*Primary Examiner*—Zarni Maung
*Assistant Examiner*—Tanim Hossain
(74) *Attorney, Agent, or Firm*—Beyer Weaver & Thomas, LLP

(57) ABSTRACT

Disclosed are methods and apparatus for handling data containing embedded addresses. In general terms, prior to transmission of data having an embedded address or port, an initiating host sends a NAT Probe to an end-host with which the initiating host wishes to communicate. The NAT Probe includes the embedded address or port and a type indicating that translation of the address and/or port is requested if needed. As the NAT Probe traverses through one or more NAT devices as it is transmitted to the end-host, each NAT device is enabled to recognize the NAT Probe type and translate the embedded address and/or port, depending upon the individual NAT device's configuration. When the NAT Probe reaches the final hop NAT device or end-host, a NAT Probe Reply is sent back to the initiating host. The NAT Probe Reply contains a translated embedded address and/or port which is compatible with the end-host's network. The NAT Probe Reply also contains a type which differs from the type of the NAT Probe. As the NAT Probe Reply traverses back through the same NAT devices, the NAT device recognize the type of the NAT Probe Reply and do not translate the embedded address and/or port. The initiating host may then use the translated embedded address and/or port for subsequent communication with the end-host. That is, the initiating host sends data having the translated embedded address and/or port to the end-host. Since the translated address/port is compatible with the end-host's network, the NAT devices through which the data passes do not have to inspect the payload of the data to handle or translate the embedded address and/or port.

24 Claims, 7 Drawing Sheets

U.S. PATENT DOCUMENTS

2002/0159447 A1* 10/2002 Carey et al. ............... 370/389
2003/0056002 A1*  3/2003 Trethewey ................. 709/238
2004/0052257 A1*  3/2004 Abdo et al. ............... 370/392

OTHER PUBLICATIONS

M. Somasundaram, et al. "Apparatus and Methods for Performing Network Address Translation (NAT) in a Fully Connected Mesh with NAT Virtual Interface (NVI)", U.S. Appl. No. 10/026,272, filed Dec. 21, 2001. 45 pages.

P. Srisuresh and M. Holdrege, "IP Network Address Translator (NAT) Terminology and Considerations", RFC 2663, Lucent Technologies, Aug. 1999. 29 pages.

S. Brim and A. Simu, "Midcom Agents and Topology", Internet Engineering Task Force's Request Internet-Draft document, Aug. 2001. 15 pages.

* cited by examiner

METHOD AND APPARATUS FOR HANDLING EMBEDDED ADDRESS IN DATA SENT THROUGH MULTIPLE NETWORK ADDRESS TRANSLATION (NAT) DEVICES

BACKGROUND OF THE INVENTION

The present invention relates to methods and apparatus for processing data within a computer network. More specifically, it relates to mechanisms for performing network address translation on data transmitted within such computer network.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP address is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may be a duplicate of an IP address that is used within another local network. When a local computer attempts to communicate with a computer outside the local network, the intermediary device matches the local computer's local IP address to one of the intermediary device's assigned IP addresses. The intermediary device than replaces the local computer's local address with the matched assigned IP address. This matched assigned IP address is then used to communicate between the local computer and the outside computer. Thus, NAT techniques allow IP address to be duplicated across local networks.

In addition to IP addresses, a packet may also contain address(es) embedded in the payload that require translation. Particular applications may embed address(es) in the payload for various application specific purposes. The current approach for supporting applications which embed IP addresses in the payload (e.g., DNS (domain name server), FTP (file transfer protocol), H.225/H.245) in a NAT environment is to add application-specific knowledge within the NAT device itself. This approach is described in detail in the Internet Engineering Task Force's Request for Comments document RFC 2663, entitled IP "Network Address Translator (NAT) Terminology and Considerations" by P. Srisuresh and M. Holdrege of Lucent Technologies (August 1999), which document is incorporated herein by reference in its entirety.

Unfortunately, this approach has several associated disadvantages. For example, this approach requires that the NAT device be reprogrammed for each new application or change in an existing application. This reconfiguration process is typically time consuming and complex. Additionally, since NAT devices are typically deployed at the edge of each local network and the number of local networks is rapidly increasing, the number of NAT devices that need to be reconfigured for a new or modified application may quickly become prohibitively large. In addition, encrypted packets cannot be NAT'ed if the encrypted packets require embedded address translation.

Accordingly, there is a need for improved network address translation mechanisms that do not require reconfiguration for each new or modified application, as well as mechanisms for handling embedded addresses.

SUMMARY OF THE INVENTION

Accordingly, the present invention provides methods and apparatus for handling data containing embedded addresses. In general terms, prior to transmission of data having an embedded address or port, an initiating host sends a NAT Probe to an end-host with which the initiating host wishes to communicate. The NAT Probe includes the embedded address or port and a type indicating that translation of the address and/or port is requested if needed. As the NAT Probe traverses through one or more NAT devices as it is transmitted to the end-host, each NAT device is enabled to recognize the NAT Probe type and translate the embedded address and/or port, depending upon the individual NAT device's configuration. When the NAT Probe reaches the final hop NAT device or end-host, a NAT Probe Reply is sent back to the initiating host. The NAT Probe Reply contains a translated embedded address and/or port which is compatible with the end-host's network. The NAT Probe Reply also contains a type which differs from the type of the NAT Probe. As the NAT Probe Reply traverses back through the same NAT devices, the NAT device recognize the type of the NAT Probe Reply and do not translate the embedded address and/or port. The initiating host may then use the translated embedded address and/or port for subsequent communication with the end-host. That is, the initiating host sends data having the translated embedded address and/or port to the end-host. Since the translated address and/port is compatible with the end-host's network, the NAT devices through which the data passes do not have to inspect the payload of the data to handle or translate the embedded address and/or port.

In one embodiment, a method for handling data transmitted within a computer network is disclosed. Data sent from a first host to a second host is received. When the data is being sent between a private network to a public network, a rule set is created for a header of the data when a rule set is not already present. When the data is being sent between a private network to a public network, the header of the received data is translated based on the rule set. When the data has a type that indicates that it is a NAT Probe, a payload address and/or port of the NAT Probe is translated based on the rule set. The payload address and port are an embedded address and an embedded port to be used in subsequent data transmission by the first host. The NAT Probe is sent towards the second host after translation.

In a further implementation, when the data has a type that indicates that it is not a NAT Probe, the NAT Probe is sent towards the second host after translation of the header but without translation of the payload. When the data is not being sent between a private network to a public network, the data is sent towards the second host without translation. In another aspect, NAT Probe is only sent when the data has not been received into a final hop NAT device. When the data has been received into a final hop NAT device, a NAT Probe Reply back towards the first host is sent after translation.

In a specific implementation, the NAT Probe is an Internet Control Message Protocol (ICMP) Request having a first type which indicates that the data is a NAT Probe. In a further aspect, the ICMP Request includes a time-to-live duration value for a session between the first and second hosts, the method further comprising deleting the rule set when the time-to-live duration has expired without interaction between the first and second hosts. In another aspect, the ICMP Request includes an application type. In another aspect, the ICMP Request includes a protocol type for the embedded port, wherein translation of the payload port is based on the protocol type.

In another embodiment, the NAT Probe is an Internet Control Message Protocol Request having a first type which indicates that the data is a NAT Probe and the NAT Probe Reply is an Internet Control Message Protocol Reply having a second type which indicates that the data is a NAT Probe Reply.

In another embodiment, the invention pertains to a computer system operable to handle data transmitted within a computer network. The computer system includes one or more processors and one or more memory. At least one of the memory and processors are adapted to provide at least some of the above described method operations. In yet a further embodiment, the invention pertains to a computer program product for handling data transmitted within a computer network. The computer program product has at least one computer readable medium and computer program instructions stored within at least one of the computer readable product configured to perform at least some of the above described method operations.

In an alternative embodiment, a method of sending data having an embedded address or port from a first host to a second host is disclosed. At a first host, prior to sending data having an embedded address or port to a second host, a NAT Probe is sent to the second host. The NAT Probe includes the embedded address or port and a type indicating that the embedded address or port is to be translated if needed. At the first host, when a NAT Probe Reply is received in response to the NAT Probe, data having the translated embedded address or port is sent to the second host. The NAT Probe Reply contains a translated embedded address or port. In a preferred embodiment, the NAT Probe is an Internet Control Message Protocol (ICMP) Request having a first payload type indicating that the embedded address or port is to be translated if needed.

In yet a further embodiment, the invention pertains to a computer program product for sending data having an embedded address or port from a first host to a second host. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
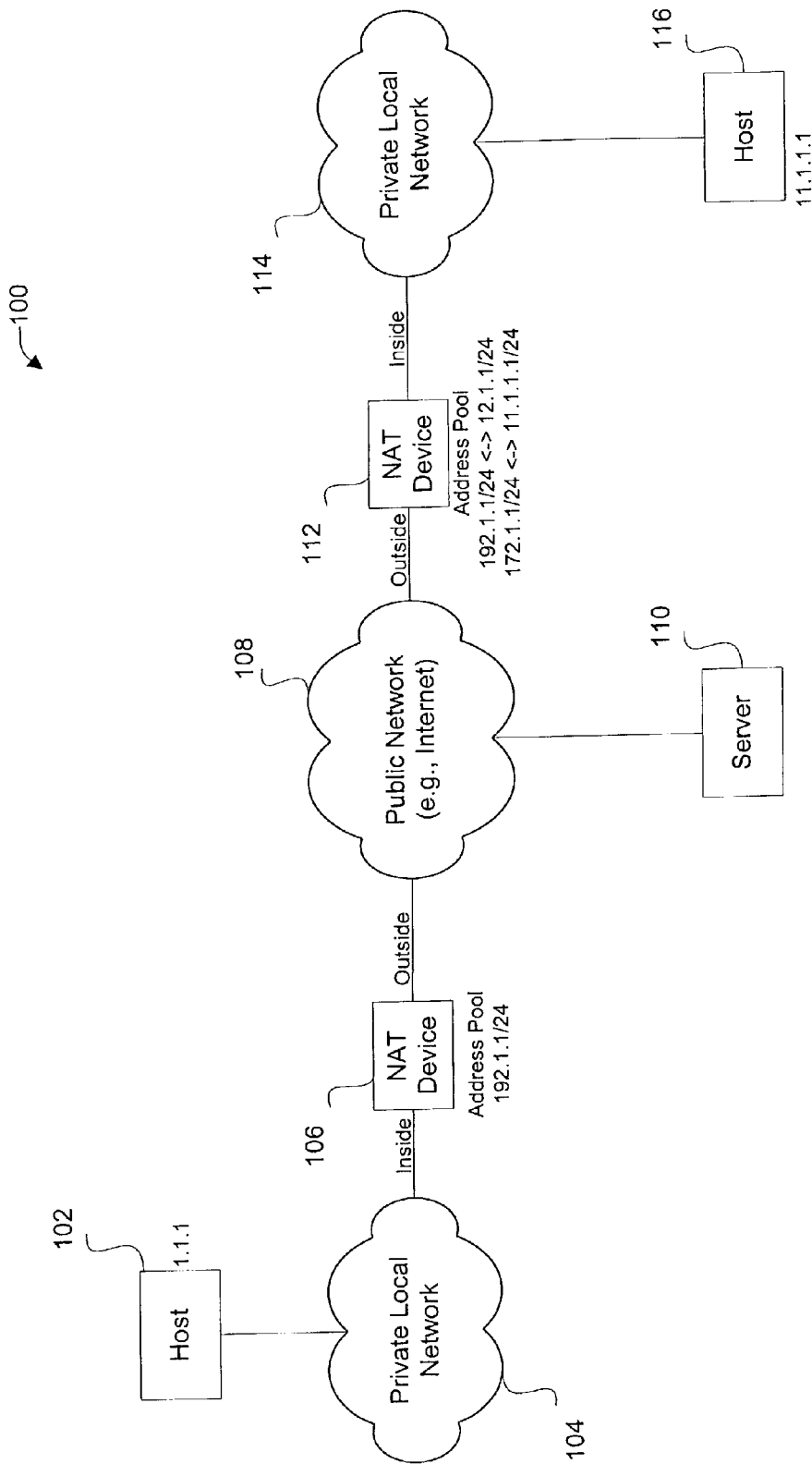
FIG. 1 is a diagrammatic representation of computer network in which the present invention may be implemented in accordance with one embodiment of the present invention.

FIG. 1 is a diagrammatic representation of computer network in which the present invention may be implemented in accordance with one embodiment of the present invention. As shown, a local or private network 104 is coupled to host 102 and a network address translation (NAT) device 106. The NAT device 106 is also coupled with a public network 106 (e.g., the Internet), which is coupled to a server 110. Alternatively, NAT device 106 may be coupled with two different local networks having two different address spaces. The public network 108 is also coupled with NAT device 112, which is coupled with private network 114, which is coupled with host 116. Each of the private network 104 and 114 and the public network 108 may be coupled with any suitable number and type of devices or hosts.

Network addresses (e.g., IP addresses) used by devices of the public network 108 (e.g., server 110) are referred to as "outside" addresses with respect to NAT device 106 and 112. Outside addresses may include addresses associated with devices coupled to the network 108 (e.g., server 110). Outside addresses may also include an address of data that is transmitted through network 108 from another network, such as host 102 of private network 104. An address from host 102, for example, is translated to be compatible with network 108 as the data travels through network 108. Network addresses associated with devices of the private network 104 are referred to as "inside" addresses with respect to NAT device 106. Likewise, network addresses associated with devices of private network 114 are referred to as "inside" addresses with respect to NAT device 112.

Although each set of addresses are unique within their respective networks, the inside address realm or local networks 104 or 114 and public network 108 may include one or more addresses that overlap with each other. To avoid duplication of network addresses by two communicating endpoints, the NAT device 108 generally translates between addresses used within the local network 104 and addresses used within the public network 110 or another local network (not shown). In the illustrated embodiment, NAT device 108 translates "inside local" addresses of data received from a local network 104 into "inside global" addresses of data being output from the NAT device 108 to public network 110, and vice versa. The NAT device 108 also translates "outside global" addresses of data received from public network 10 into "outside local" addresses of data being output from the NAT device 108 to local network 104, and vice versa. The NAT may also (or alternatively) translate ports, such as TCP (transmission control protocol) or UDP (User Datagram Protocol) ports, between the two realms. Alternatively or additionally, the NAT device 108 may alternatively be configured to translate between two different "inside" address realms. For example, a first local network may use a first set of addresses, while a second local network uses a second set of addresses. The NAT device also maintains state information regarding each network address translation. NAT device 112 is similarly configured to translate between inside addresses of private network 114 and outside addresses of public network 108.

Several typical operations that may be performed during a traditional NAT are omitted so as to not obscure the invention with unnecessary details which are well known to those skilled in the art. For instance, the present invention may include mechanisms for logging an error if a private address has no defined binding or rule set and there are no more available public addresses in the NAT device's pool for translation. Additionally, mechanisms may be included for handling TCP packets. Several typical procedures that may be performed on data along with translating the data and/or sending it to its destination are described further in U.S. patent having U.S. Pat. No. 5,793,763 by Mayes et al., issued Aug. 11, 1998 and U.S. patent application having application Ser. No. 10/026,272 by Somasundaram, Mahadev et al, filed Dec. 21, 2001, which patent and application are incorporated herein in their entirety.

One solution for handling translation of an address or port that is embedded in data by a particular application includes removing the application logic from the NAT box. That is, the application logic is separately contained in an Application Logic Gateway (ALG) device or in each host, while the NAT mechanisms are maintained in a NAT device. In such a scenario, NAT and ALG will reside on separate boxes and communicate through a protocol. Details of this scenario are further described in an Internet Engineering Task Force's Request Internet-Draft document, entitled IP "Midcom Agents and Topology" by S. Brim and A. Simu of Cisco Systems, Inc. (August 2001), which document is incorporated herein by reference in its entirety.

In this scenario, the NAT device does not handle network addresses embedded within the data's payload. That is, the NAT device 108 merely translates network addresses within the header and not the payload. Instead, an independent ALG, handles data having embedded addresses prior to transmission of such data by a host or upon receipt of such data at a host. By way of illustration, if host 102 wishes to send data having an embedded address to host 116, the ALG (e.g., configured in host 102) analyzes the data to be transmitted and sends a translation request having the embedded address to the NAT device associated with host 102 (e.g., NAT device 106). The NAT device 106 is configured to recognize the format of the translation request and translate the embedded address and send a reply back to the ALG or host 102 with the translated embedded address. Several embodiments of this solution are described further in co-pending U.S. patent application having application Ser. No. 10/125,300, by Adina Simu et al., filed 17 Apr. 2002, which application is herein incorporated by reference in its entirety.

Although this solution may work well in a communication scenario which utilizes a single NAT device, this solution may result in an erroneous translation of the embedded address when data is transmitted through multiple NAT devices. For example, if NAT device 106 uses an address pool which overlaps with the address pool of the destination private network 114, the translated embedded address provided by NAT device 106 may be invalid for private network 114.

The present invention provides a mechanism for reliably obtaining a translation for an embedded address and/or port within a communication scenario that utilizes multiple NAT devices. In general terms, a host who wishes to initiate a session (a session initiator) using an embedded address sends a NAT Probe containing the embedded address to the destination host through one or more NAT devices. The NAT Probe has a type or tag which indicates that a rule set should be created for the embedded address and the embedded address should be translated (if needed). As the NAT Probe traverses across each NAT device within its path to the destination host, each NAT device is operable to translate the embedded address and pass the NAT probe to the next hop (e.g., NAT device). When the final hop NAT device or end-host receives the NAT Probe, it sends the last translated embedded address within a NAT Probe Reply back to the session initiator. The NAT devices in the return path are enabled to not inspect the NAT Probe Reply, but merely translate the header (if needed) as the NAT Probe Reply traverses back to the session initiator. Thus, the session initiator receives a translated embedded address that was last translated by the last hop NAT device and, accordingly, is an address which is acceptable to the end-host.

Figure 2:
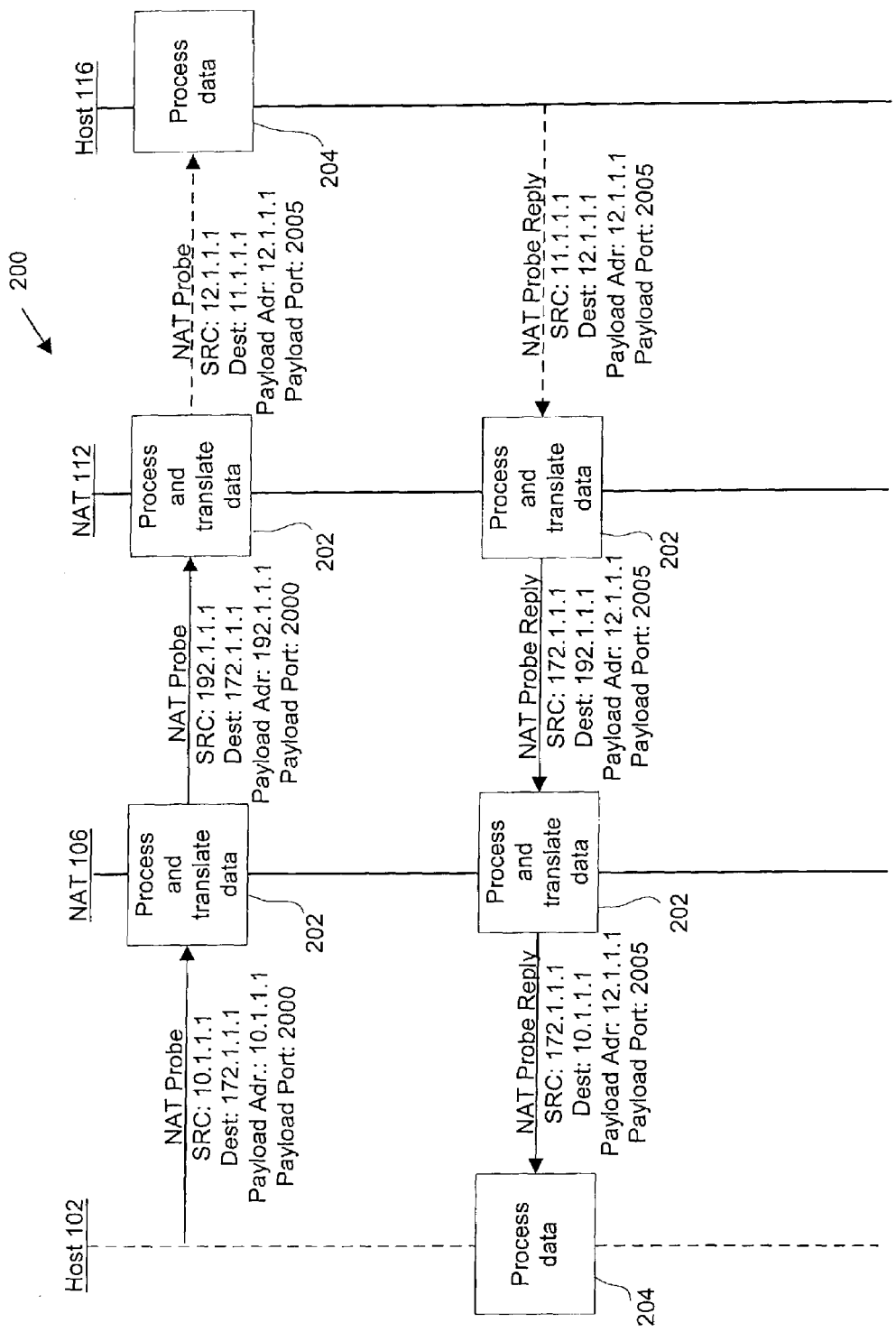
FIG. 2 is a communication diagram illustrating a procedure for handling data having an embedded address in accordance with one embodiment of the present invention.

FIG. 2 is a communication diagram illustrating a specific example of a procedure 200 for handling data having an embedded address (and/or port) in accordance with one embodiment of the present invention. As shown, host 102 initially sends a NAT Probe to NAT device 106. The NAT Probe generally includes source address 10.1.1.1, destination address 172.1.1.1, payload address 10.1.1.1, and payload port 2000. The payload address and port correspond to an address and port which the host 102 will subsequently embed in communication data to host 116. The destination address 172.1.1.1 of host 116 may be obtained in any suitable manner. For example, host 106 may initiate a DNS query to a DNS Server (not shown) for the public address of host 116.

The NAT Probe may have any suitable format for requesting translation of an embedded address from a NAT device. In one embodiment, the NAT Probe is in the form of an Internet Control Message Protocol (ICMP) Request. Table 1 shows one format of a suitable ICMP Request sent by host 102 to host 116:

TABLE 1

NAT Probe

| IP Header: | |
|---|---|
| Source Address | 10.1.1.1 |
| Destination Address | 172.1.1.1 |
| ICMP Header: | |
| Type | 15 |
| ICMP Content: | |
| Request Type | Create |
| Payload Address | 10.1.1.1 |
| Payload Port | 2000 |
| Payload Protocol | UDP (User Datagram Protocol) |
| TTL | <x> |

The ICMP Type indicates to a receiving NAT device that this ICMP packet is a NAT Probe. The NAT device will then know to translate the Payload Address (e.g. 10.1.1.1) and/or the Payload Port (e.g., 2000) before transmission of the ICMP Request to the next NAT device 112, as described further below. The Payload Protocol indicates the protocol type for the Payload Port. Thus, the NAT device will know which type of port (e.g., UDP or TCP (transmission control protocol) type port) to use for the translated port (if any). The TTL or time-to-live field indicates how long a time period after a host or communication session becomes inactive the NAT device keeps state information regarding the particular host or session. The TTL field may be set to any suitable time duration and depends on the particular requirements of the communication application.

The ICMP Request's payload may include any suitable application parameter that may be utilized by a NAT device. For instance, the payload may include an application type. A NAT device may use the application type to construct a firewall for its associated hosts against communication sessions having a particular application type, such as a chat session. In a real world example, a corporation may wish to prohibit its employees from participating in chat sessions, which may tend to lower employee efficiency.

After receipt of the NAT Probe, the NAT device 106 then processes and translates the NAT Probe in operation 202. In general, operation 202 includes translating the header and payload address and/or port of the NAT Probe. As shown, the NAT device 106 translates the NAT Probe to have a source address 192.1.1.1, a destination address 172.1.1.1, and payload address 192.1.1.1. In this example, the NAT device 106 does not translate any ports. The NAT device 106 then sends the NAT Probe to NAT device 112. The NAT device 112 then processes and translates the NAT Probe in operation 202. The NAT device 112 then sends a translated NAT Probe to host 116. The translated NAT Probe includes a source address 12.1.1.1, a destination address 11.1.1.1, payload address 12.1.1.1, and payload port 2005. In this case, the NAT device 112 translates the source port 2000 to 2005. A NAT device may be configured to translate a port for any number of reasons. For example, a NAT device may use a single pool address for multiple hosts, but assign a unique port to such hosts. The host 116 then processes the NAT Probe in operation 204. In general, when a host receives a NAT Probe, process 204 includes returning a NAT Probe Reply. In the example of FIG. 2, the NAT Probe Reply includes source address 11.1.1.1, destination address 12.1.1.1, payload address 12.1.1.1, and payload port 2005. Alternatively, NAT device 112 may be configured to return the NAT Probe Reply, instead of the end-host, without forwarding the translated NAT Probe to host 116.

The payload of the NAT Probe Reply remains the same as it is transmitted from host 116 to host 102 via NAT devices 112 and 106. In the illustrated embodiment, after the NAT device 112 receives the NAT Probe Reply from host 116, the NAT device 112 then processes and translates the NAT Probe Reply in operation 202. As a result of process 202, the NAT device 112 sends a translated NAT Probe Reply having source address 172.1.1.1, destination address 192.1.1.1, payload address 12.1.1.1, and payload port 2005 to NAT device 106. The NAT device 106 than processes and translates the NAT Probe Reply in operation 202. The NAT device 106 then sends the translated NAT Probe Reply to host 102. This NAT Probe Reply includes source address 172.1.1.1, destination address 10.1.1.1, payload address 12.1.1.1, and payload port 2005.

In the example of FIG. 2, host 102 sends a NAT Probe to host 116 through NAT devices 106 and 112. However, host 102 may send a NAT Probe to any host or server through any number and type of NAT devices. For example, host 102 may send a NAT probe to Server 110. In this case, the NAT Probe only traverses through NAT device 106 and the header and payload of the NAT Probe are only translated once by NAT device 106.

Figure 3:
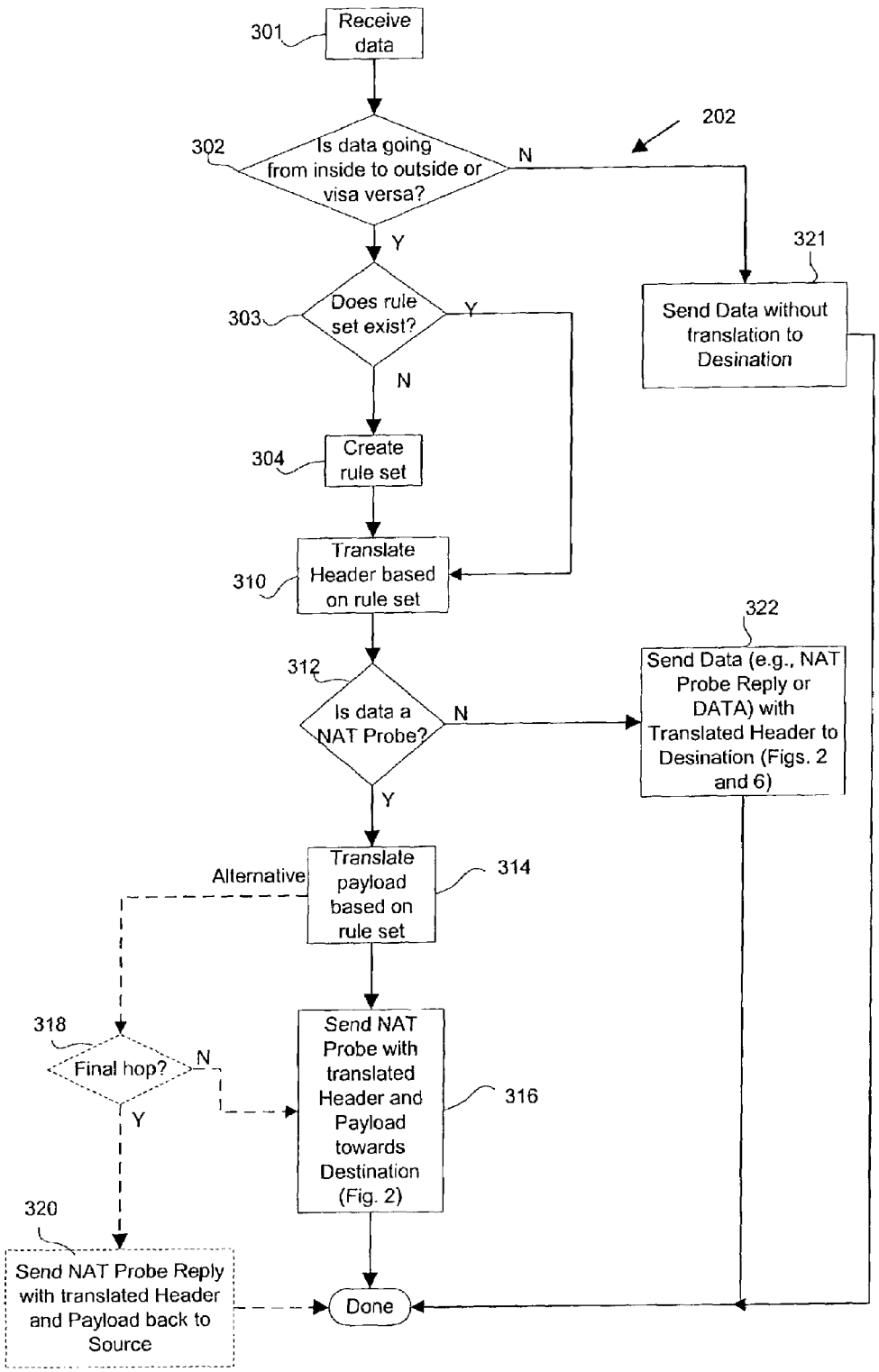
FIG. 3 is a flowchart illustrating the operation of FIG. 2 of processing and translating data received into a network address translation (NAT) device in accordance with one embodiment of the present invention.

FIG. 3 is a flowchart illustrating the operation 202 of processing and translating data received into a NAT device (e.g., 106 or 112) in accordance with one embodiment of the present invention. The communication example shown in FIG. 2 will be used to illustrate this embodiment. Initially, data is received in operation 301. It is then determined whether the data is being transmitted from the inside (e.g., from private network 104) to the outside (e.g., to public network 108) or visa versa in operation 302. If the data is not being transmitted between the inside and outside, translation is not required and the received data is simply forwarded to its destination in operation 321.

If the received data is being transmitted between the inside and outside, it is then determined whether a binding or rule set exists for the received data in operation 303. In the present example, when a NAT Probe is received into NAT device 106 from an inside network (e.g., 104) destined for an outside network (e.g., 108), it is determined whether a rule set exists for the source address and/or destination address. In thhis case, a binding is only created for the source address but not the destination address. However, in other applications, a rule set may also exist or be created for the destination or host 116, depending on the configuration of the NAT device. For example, the NAT device 106 may be configured to convert the address space used by host 116 to another address space which is more compatible with the address space of the source, e.g., if the address space of host 116 overlaps with the address space of private network 104. In this alternative case, the NAT device 106 translates between an outside local and an outside global address for host 116.

In the present example, since the address space used by the host 102 (i.e., 10.1.1.0/24) is a private address space which is only unique within the private network 104, the NAT device 106 is configured to translate addresses associated with hosts of private network 104 into unique public or global addresses. The NAT device 106 may operate to create a rule set from a pool of addresses for each host address as data associated with each host is initially received into the NAT device 106. As shown, the NAT device 106 has address pool 192.1.1/24 and converts between private address space 10.1.1/24 of private network 104 and public address space 192.1.1/24 of public network 108. Similarly, NAT device 112 has address pools 192.1.1/24 and 172.1.1/24. Similarly, NAT device 112 translates between private address space 11.1.1/24 of private network 114 and public address space 172.1.1/24 of public network 108, and translates between private address space 12.1.1/24 of private network 114 and public address space 192.1.1/24 of public network 108.

Referring back to the illustrated embodiment, if no rule set exists for the received data, a rule set is then created in operation 304. Otherwise, this operation is skipped. In the example of FIG. 2, when NAT device 106 receives NAT Probe from host 106 destined for host 116, NAT device 106 creates a rule set for host 106 having an inside local address 10.1.1.1 and an inside global address 192.1.1.1. Similarly, when NAT device 112 receives this translated NAT Probe, NAT device 112 creates a rule set for host 106 having an outside global address 192.1.1.1 and port 2000 and an outside local address 12.1.1.1 and port 2005. The NAT device 112 may likely already have a rule set for host 116. For example, the NAT device 112 may have created a rule set for host 116 during a previous DNS query initiated by host 106 for the public address of host 116. During such query, a DNS server's response to such DNS query passes through the NAT device 112 so that the NAT device 112 became aware of the local address for host 116 (contained in the DNS response) and assigned a global address for host 116 from its 172.1.1/24 pool. The NAT device then forms a rule set for host 116 having inside global address 172.1.1.1 and inside local address 11.1.1.1. The rule set for host 106 and host 116 may be combined into a single rule set.

Figure 4A:
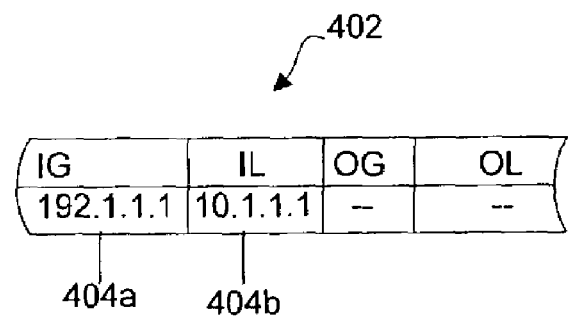
FIG. 4A illustrates a first example rule set that may be pre-configured or created in a NAT device in accordance with one embodiment of the present invention.
Figure 4B:
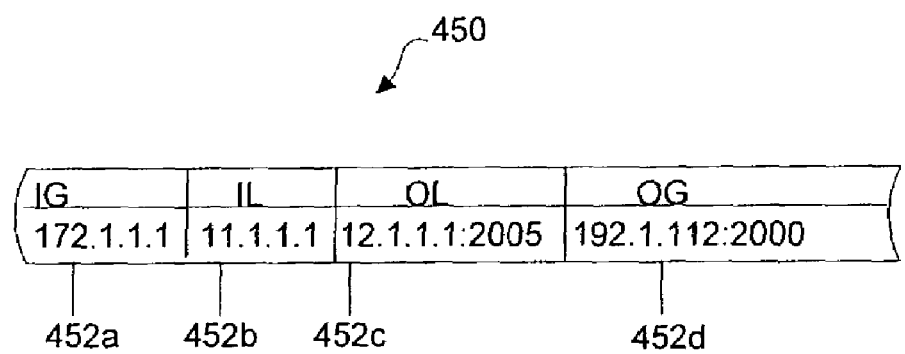
FIG. 4B illustrates a second example rule set that is pre-configured or created in an NAT device in accordance with one embodiment of the present invention.

FIG. 4A illustrates an example rule set 402 that may be pre-configured or created in NAT device 106 for host 102. As shown, the rule set 402 includes an inside global address 192.1.1.1 and an inside local address 10.1.1.1 for host 402. FIG. 4B illustrates an example rule set 450 pre-configured or created in NAT device 112 for both host 102 and host 116. This rule set 450 of NAT device 112 includes an inside global address 172.1.1.1 and an inside local address 11.1.1.1 for host 116. The rule set 450 of NAT device 112 also includes an outside global address 192.1.1.1 and port 2000 and an outside local address 12.1.1.1 and port 2005 for host 102. In the example of FIG. 2, rule set 402 is created by NAT device 106 after receipt of a NAT Probe sent by host 102 to host 116, and rule set 450 is created by NAT device 112 after receipt of the NAT Probe sent by host 102 to host 116, as well as a DNS query and response for the public address of host 116.

When data is subsequently sent (after the initial NAT Probe) between hosts 102 and 116 (e.g., in the form of a NAT Probe Reply or other type of communication DATA), each NAT device 106 and 112 skips the operation 304 for creating a rule set since a rule set for these hosts already exists for NAT devices 106 and 112.

After a rule set for the received data is created in operation 304 or this operation is skipped because a rule set already exists for the received data, the header of the received data is then translated based on the received data's associated rule set in operation 310. In the present example, when data is sent from host 102 to host 106, NAT device 106 translates the source address for host 102 from an inside local address 10.1.1.1 to the corresponding inside global address 192.1.1.1 based on rule set 402. NAT device 112 then translates the source address for host 102 from an outside global address 192.1.1.1 to an outside local address 12.1.1.1 and translates the destination address for host 116 from inside global address 172.1.1.1 to inside local address 11.1.1.1 based on rule set 450. NAT device 112 also translates the source port for host 102 from 2000 to 2005 based on rule set 450. When data is sent from host 116 to host 102, this translation sequence is reversed (e.g., see FIG. 6).

It is then determined whether the data is a NAT Probe in operation 312. If the data is a NAT Probe, the data's payload is then translated based on the rule set in operation 314. In other words, an payload address and/or port is translated. In the illustrated example of FIG. 2, the NAT Probe initially contains a payload address 10.1.1.1 and port 2000 which corresponds to host 102. NAT device 106 translates the payload address into an inside global address 192.1.1.1 for host 102 based on rule set 402. NAT device 112 then translates the translated embedded address 192.1.1.1 from an outside global address to an outside local address 12.1.1.1 based on rule set 450. NAT device 112 also translates the payload port 2000 into payload port 2005 based on rule set 250.

A NAT Probe having the translated payload and header is then sent towards the destination in operation 316. As shown in FIG. 2, NAT device 106 sends the NAT Probe to the next NAT device 112, and NAT device 112 then sends the NAT Probe to host 116 after translation is complete. The procedure 202 then ends.

If the data is not a NAT Probe (e.g., a NAT Probe Reply or other type of DATA), the data is then sent with a translated header without translation of the payload to the data's destination in operation 322. As illustrated in FIG. 2, when a NAT Reply is received into NAT device 112 from host 116 in response to a NAT Probe, the payload or translated embedded address is not modified. The header is merely modified based on rule sets 402 and 450, respectively.

In an alternative embodiment, after the payload is translated for a NAT Probe, it is then determined whether the particular NAT device is the final hop in operation 318. If the NAT device is not the final hop, the NAT Probe is sent towards the destination in operation 316 after translation of the header and payload address and/or port. However, if the NAT device is the final hop (e.g., NAT 112 in the example of FIG. 2), a NAT Probe Reply is then sent with a translated header and translated payload back towards the source in operation 320. This alternative approach allows a quicker response time for the NAT Probe then the illustrated embodiment of FIG. 2 where the destination or host 116 sends the NAT Probe Reply. The procedure 202 then ends.

The NAT Probe Reply may have any suitable format to communicate the translated embedded address to the originating host. In one embodiment, the NAT Probe Reply is in the form of an Internet Control Message Protocol (ICMP) Reply. Table 2 shows one format of a suitable ICMP Reply sent by host 116 in response to a NAT Probe from host 102:

TABLE 2

| NAT Probe Reply | |
| --- | --- |
| IP Header: | |
| Source Address | 12.1.1.1 |
| Destination Address | 11.1.1.1 |
| ICMP Header: | |
| Type | 16 |
| ICMP Content: | |
| Request Type | NA |
| Payload Address | 12.1.1.1 |
| Payload Port | 2005 |

TABLE 2-continued

NAT Probe Reply

| Payload Protocol | UDP |
|---|---|
| TTL | <x> |

The ICMP Type indicates to a receiving NAT device that this ICMP packet is a NAT Probe Reply. The NAT device will then know to only translate the header of the NAT Probe Reply and pass it on to towards the destination without translation of the payload. The other fields are described further above with respect to the NAT Probe of Table 1.

Figure 5:
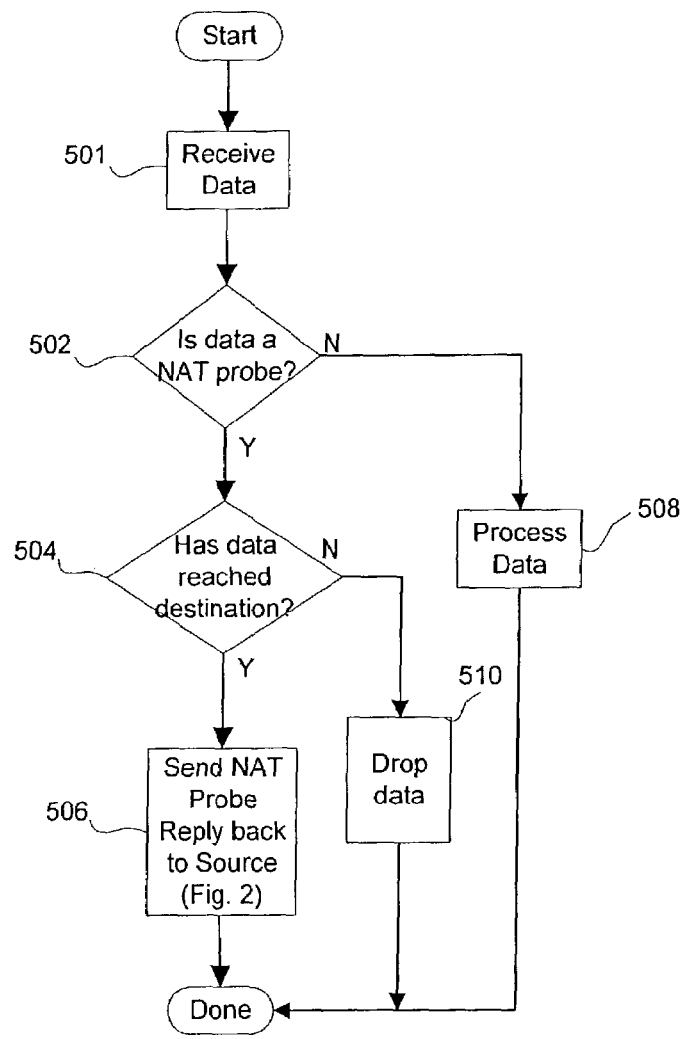
FIG. 5 is a flowchart illustrating the operation of FIG. 2 for processing data received in a host in accordance with one embodiment of the present invention

FIG. 5 is a flowchart illustrating the operation 204 of FIG. 2 for processing data received into a host (e.g., 102 or 116) in accordance with one embodiment of the present invention. Initially, data is received in operation 501, and it is then determined whether the received data is a NAT Probe in operation 502. If the data is a NAT Probe, it is then determined whether the data has reached its intended destination in operation 504. For example, does the destination address correspond to the receiving host 116. If the data has reached its final destination, a NAT Probe Reply is then sent back to the source in operation 506.

When a NAT Probe has reached its final destination, the payload address and/or port of the NAT Probe has been translated by one or more NAT devices during its transmission from the originating host to the destination host. The NAT Probe then ideally contains a translated embedded address that may be used by the final destination host's network. In the example of FIG. 2, the NAT Probe contains embedded address 12.1.1.1 which is an address that was selected from the address pool 12.1.1/24 NAT device 112 to be unique within network 114.

If it determined that the data is not a NAT Probe, the data is processed in any suitable manner in operation 508 by host 116. If the data has not reached its destination, the packet may simply be dropped in operation 510. An error message may also be sent back to the source when a packet is dropped.

Figure 6:
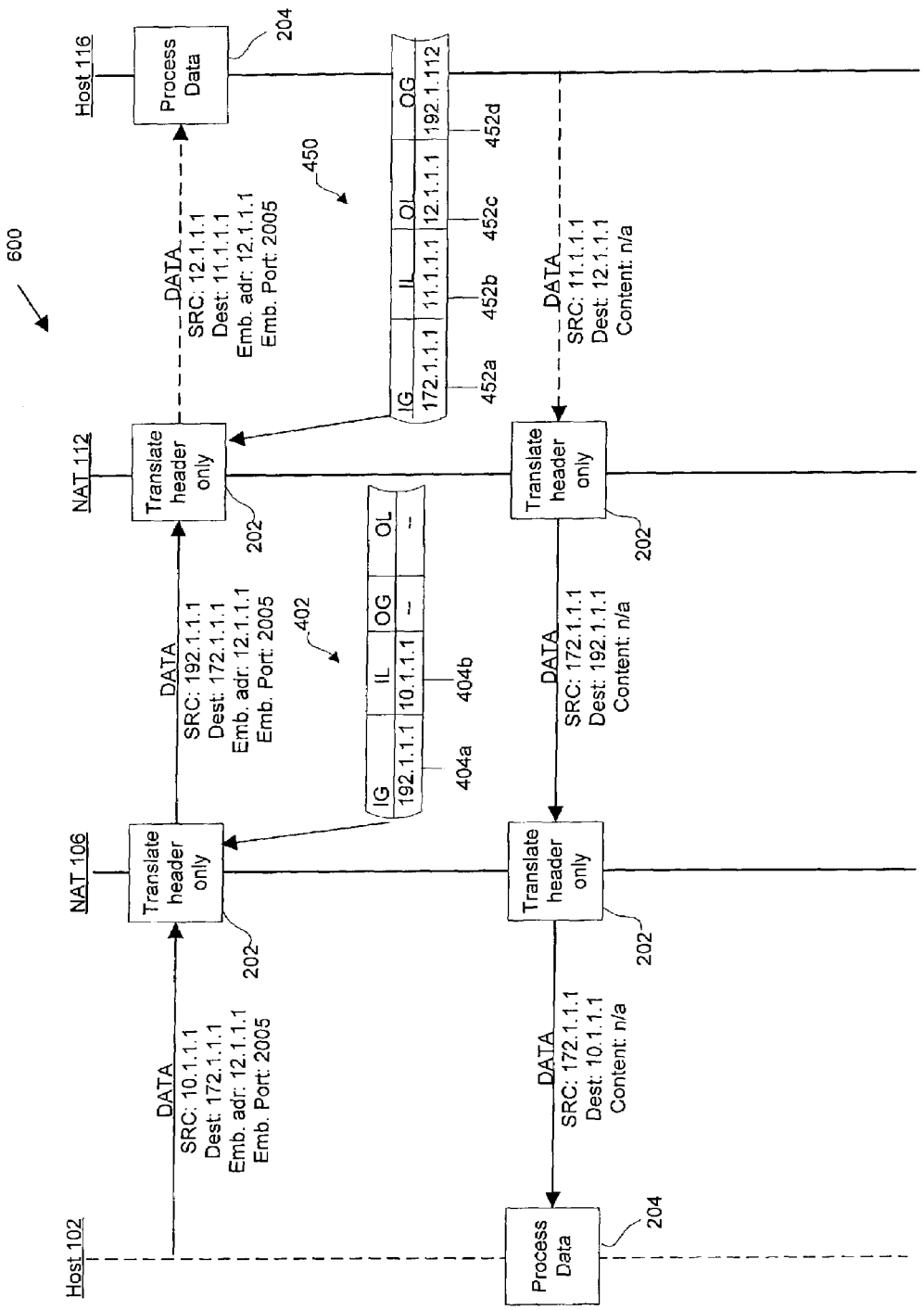
FIG. 6 is a communication diagram illustrating communication between a first host and a second host after the first host has received a NAT Probe Reply from the second host in accordance with one embodiment of the present invention.

FIG. 6 is a communication diagram illustrating communication between host 102 and host 116 after host 102 has received a NAT Probe Reply from host 116 in accordance with one embodiment of the present invention. As shown, data having source address 10.1.1.1, destination address 172.1.1.1, embedded address 12.1.1.1, and embedded port 2005 is sent to NAT device 106. The NAT device 106 simply translates the header of the data and not the embedded address or port in operation 202. The data is then transmitted to NAT device 112 with a source address 192.1.1.1, destination address 172.1.1.1, embedded address 12.1.1.1, and embedded port 2005. NAT device 112 then translates only the header in operation 202, and the NAT device 112 then sends the data having a source address 12.1.1.1, destination address 11.1.1.1, embedded address 12.1.1.1, and embedded port 2005 to host 116. The data is then processed in operation 204 by host 116. As shown, the translation performed at NAT device 106 is based on rule set 402, while the translation at NAT device 112 is based on rule set 450. These rule sets were previously created when a NAT Probe was sent to host 116 by host 102.

The host 116 may then respond with data having source address 11.1.1.1 and destination address 12.1.1.1. NAT device 112 then translates the header only in operation 202. The translated data then has source address 172.1.1.1 and destination address 192.1.1.1. The NAT device 106 receives this data and translates the header only in operation 202. The translated data then has source address 172.1.1.1 and destination address 10.1.1.1. This data is sent from NAT device 106 to host 102. The host 102 then processes the data in operation 204.

Generally, the techniques of the present invention for handling data having an embedded address or translating addresses (or ports) may be implemented on software and/or hardware. For example, either technique can be implemented in an operating system kernel, in a separate user process, in a library package bound into network applications, on a specially constructed machine, or on a network interface card. In a specific embodiment of this invention, some of the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the data processing systems (e.g., host or NAT device) may each be implemented on a general-purpose network host machine such as a personal computer or workstation. Further, the invention may be at least partially implemented on a card (e.g., an interface card) for a network device or a general-purpose computing device.

Figure 7:
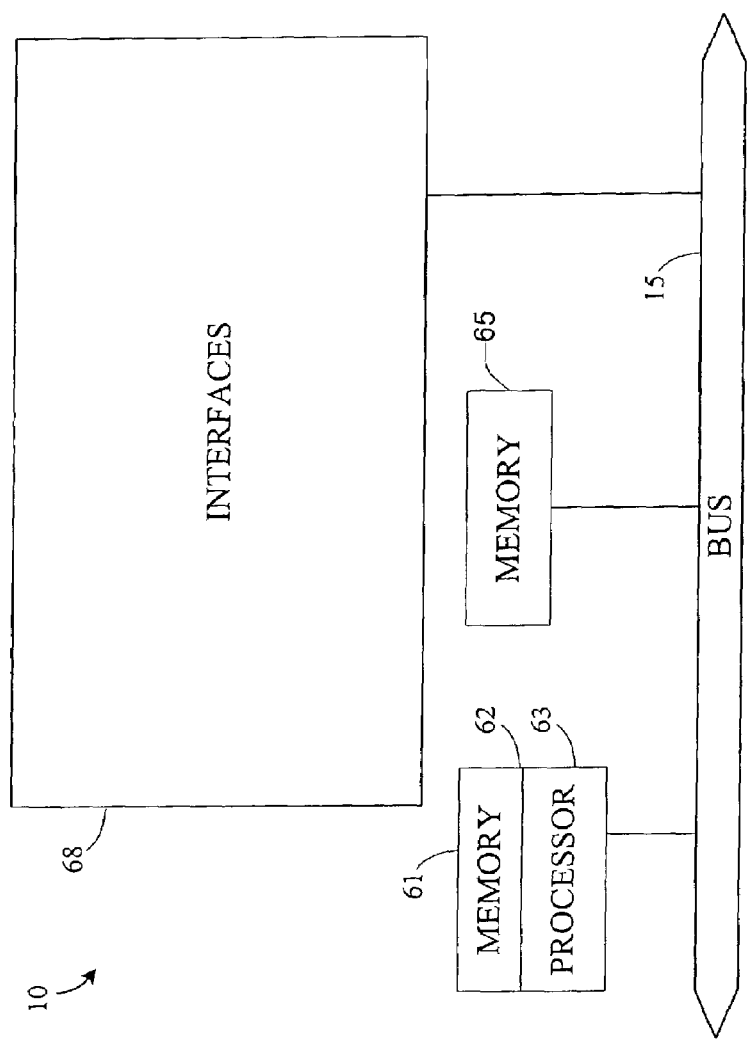
FIG. 7 is a diagrammatic representation of a router in which embodiments of the present invention may be implemented.

Referring now to FIG. 7, a router 10 suitable for implementing embodiments of the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for performing address and/or port translations, creating rule sets, handling NAT Probes and Replies, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, application type and their corresponding data formats, TTL values for each session, rule sets, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for handling data transmitted within a computer network, the method comprising:

receiving data having a type that indicates that it is a NAT Probe sent from a first host to a second host, wherein the NAT Probe is being sent between a private network and a public network;

creating a rule set for a header of the NAT Probe when a rule set is not already present, wherein the rule set includes a binding between a private address/port and a public address/port selected from a pool of public addresses/ports;

translating the header of the NAT Probe based on the rule set, translating a payload address and/or port of the NAT Probe based on the rule set;

sending the NAT Probe towards the second host after translation of the header and payload;

after sending the NAT Probe, receiving data having a type that indicates that it is a NAT Probe Reply, wherein the NAT Probe Reply is being sent between a private network to a public network and includes a payload address and/or payload port that has been translated one or more times so as to be a part of an address space of the second host and is to be used in a payload of subsequent data sent from the first host to the second host; and translating the header of the NAT Probe Reply based on the rule set without translating the payload address or payload port of the NAT Probe Reply.

2. A method as recited in claim 1, wherein the payload address and/or payload port of the NAT Probe Reply corresponds to the first host.

3. A method as recited in claim 1, wherein the NAT Probe is only sent when the NAT Probe has not been received into a final hop NAT device, the method further comprising:

when the NAT Probe has been received into a final hop NAT device, sending the NAT Probe Reply back towards the first host after translation of the header of the NAT Probe Reply.

4. A method as recited in claim 1, wherein the rule set includes a binding between a private address and a public address selected from a pool of public addresses.

5. A method as recited in claim 4, wherein the private address is a source address of the received data when the first host is located within a private network.

6. A method as recited in claim 4, wherein the private address is a destination address of the received data when the second host is located within a private network.

7. A method as recited in claim 1, wherein the NAT Probe is an Internet Control Message Protocol (ICMP) Request having a first type which indicates that the data is a NAT Probe.

8. A method as recited in claim 7, wherein the ICMP Request includes a time-to-live duration value for a session between the first and second hosts, the method further comprising deleting the rule set when the time-to-live duration has expired without interaction between the first and second hosts.

9. A method as recited in claim 8, wherein the ICMP Request includes an application type, the method further comprising prohibiting communication between the first and second host when the application type is a predetermined application type.

10. A method as recited in claim 8, wherein the ICMP Request includes a protocol type for the payload port, wherein translation of the payload port is based on the protocol type.

11. A method as recited in claim 1, wherein the NAT Probe is an Internet Control Message Protocol Request having a first type which indicates that the data is a NAT Probe and the NAT Probe Reply is an Internet Control Message Protocol Reply having a second type which indicates that the data is a NAT Probe Reply.

12. A computer system operable to handle data transmitted within a computer network, the computer system comprising:
  one or more processors;
  one or more memory, wherein at least one of the processors and memory are adapted to:
  receive data having a type that indicates that it is a NAT Probe sent from a first host to a second host, wherein the NAT Probe is being sent between a private network and a public network;
  create a rule set for a header of the NAT Probe when a rule set is not already present, wherein the rule set includes a binding between a private address/port and a public address/port selected from a pool of public addresses/ports;
  translate the header of the NAT Probe based on the rule set,
  translate a payload address and/or port of the NAT Probe based on the rule set;
  send the NAT Probe towards the second host after translation of the header and payload;
  after sending the NAT Probe, receive data having a type that indicates that it is a NAT Probe Reply, wherein the NAT Probe Reply is being sent between a private network and a public network and includes a payload address and/or payload port that has been translated one or more times so as to be a part of an address space of the second host and is to be used in a payload of subsequent data sent from the first host to the second host; and
    translate the header of the NAT Probe Reply based on the rule set without translating the payload address or payload port of the NAT Probe Reply.

13. A computer system as recited in claim 12, wherein the payload address and/or payload port of the NAT Probe Reply corresponds to the first host.

14. A computer system as recited in claim 12, wherein the NAT Probe is only sent when the data has not been received into a final hop NAT device, wherein at least one of the processors and memory are further adapted to:
  when the data has been received into a final hop NAT device, sending the NAT Probe Reply back towards the first host after translation.

15. A computer system as recited in claim 12, wherein the NAT Probe is an Internet Control Message Protocol (ICMP) Request having a first type which indicates that the data is a NAT Probe.

16. A computer system as recited in claim 15, wherein the ICMP Request includes a time-to-live duration value for a session between the first and second hosts, the method further comprising deleting the rule set when the time-to-live duration has expired without interaction between the first and second hosts.

17. A computer system as recited in claim 12, wherein the NAT Probe is an Internet Control Message Protocol Request having a first type which indicates that the data is a NAT Probe and the NAT Probe Reply is an Internet Control Message Protocol Reply having a second type which indicates that the data is a NAT Probe Reply.

18. A computer program product for handling data transmitted within a computer network, the computer program product comprising:
  at least one computer readable medium;
  computer program instructions stored within the at least one computer readable product configured to:
    receive data having a type that indicates that it is a NAT Probe sent from a first host to a second host, wherein the NAT Probe is being sent between a private network and a public network;
    create a rule set for a header of the NAT Probe when a rule set is not already present, wherein the rule set includes a binding between a private address/port and a public address/port selected from a pool of public addresses/ports;
    translate the header of the NAT Probe based on the rule set,
    translate a payload address and/or port of the NAT Probe based on the rule set;
    send the NAT Probe towards the second host after translation of the header and payload;
    after sending the NAT Probe, receive data having a type that indicates that it is a NAT Probe Reply, wherein the NAT Probe Reply is being sent between a private network to a public network and includes a payload address and/or payload port that has been translated one or more times so as to be a part of an address space of the second host and is to be used in a payload of subsequent data sent from the first host to the second host; and
    translate the header of the NAT Probe Reply based on the rule set without translating the payload address or payload port of the NAT Probe Reply.

19. A computer program product as recited in claim 18, wherein the payload address and/or payload port of the NAT Probe Reply corresponds to the first host.

20. A computer program product as recited in claim 18, wherein the NAT Probe is only sent when the data has not been received into a final hop NAT device, the computer program instructions stored within the at least one computer readable product further configured to:
  when the data has been received into a final hop NAT device, sending the NAT Probe Reply back towards the first host after translation.

21. A computer program product as recited in claim 18, wherein the NAT Probe is an Internet Control Message Protocol (ICMP) Request having a first type which indicates that the data is a NAT Probe.

22. A computer program product as recited in claim 21, wherein the ICMP Request includes a time-to-live duration value for a session between the first and second hosts, the computer program instructions stored within the at least one computer readable product further configured to delete the rule set when the time-to-live duration has expired without interaction between the first and second hosts.

23. A computer program product as recited in claim 18, wherein the NAT Probe is an Internet Control Message Protocol Request having a first type which indicates that the data is a NAT Probe and the NAT Probe Reply is an Internet Control Message Protocol Reply having a second type which indicates that the data is a NAT Probe Reply.

24. An apparatus for handling data transmitted within a computer network, the apparatus comprising:
  means for receiving data having a type that indicates that it is a NAT Probe sent from a first host to a second host, wherein the NAT Probe is being sent between a private network and a public network;
  means for creating a rule set for a header of the NAT Probe when a rule set is not already present, wherein the rule set includes a binding between a private address/port and a public address/port selected from a pool of public addresses/ports;
  means for translating the header of the NAT Probe based on the rule set, means for translating a payload address and/or port of the NAT Probe based on the rule set;

means for sending the NAT Probe towards the second host after translation of the header and payload;

means for receiving data having a type that indicates that it is a NAT Probe Reply after sending the NAT Probe, wherein the NAT Probe Reply is being sent between a private network to a public network and includes a payload address and/or payload port that has been translated one or more times so as to be a part of an address space of the second host and is to be used in a payload of subsequent data sent from the first host to the second host; and means for translating the header of the NAT Probe Reply based on the rule set without translating the payload address or payload port of the NAT Probe Reply.

* * * * *